United States Patent
Cheng et al.

(10) Patent No.: US 12,522,700 B2
(45) Date of Patent: Jan. 13, 2026

(54) POLYOLEFIN MICROPOROUS FILM AND PREPARATION METHOD THEREOF

(71) Applicant: SHANGHAI ENERGY NEW MATERIALS TECHNOLOGY CO., LTD., Shanghai (CN)

(72) Inventors: Yue Cheng, Shanghai (CN); Kun Li, Shanghai (CN); Kun Peng, Shanghai (CN); Bei Jin, Shanghai (CN); Qianqian Liu, Shanghai (CN)

(73) Assignee: SHANGHAI ENERGY NEW MATERIALS TECHNOLOGY CO., LTD., Shanghai (CN)

( * ) Notice: Subject to any disclaimer, the term of this patent is extended or adjusted under 35 U.S.C. 154(b) by 768 days.

(21) Appl. No.: 17/598,382

(22) PCT Filed: Apr. 19, 2021

(86) PCT No.: PCT/CN2021/088081
§ 371 (c)(1),
(2) Date: Jul. 1, 2022

(87) PCT Pub. No.: WO2022/052469
PCT Pub. Date: Mar. 17, 2022

(65) Prior Publication Data
US 2022/0356313 A1    Nov. 10, 2022

(30) Foreign Application Priority Data

Sep. 9, 2020  (CN) .......................... 202010940471.1

(51) Int. Cl.
| | | |
|---|---|---|
| *C08J 5/18* | (2006.01) | |
| *C08J 9/00* | (2006.01) | |
| *C08J 9/26* | (2006.01) | |
| *C08L 23/06* | (2006.01) | |

(52) U.S. Cl.
CPC ............... *C08J 5/18* (2013.01); *C08J 9/0061* (2013.01); *C08J 9/26* (2013.01); *C08L 23/06* (2013.01); *C08J 2201/0462* (2013.01); *C08J 2323/06* (2013.01); *C08J 2423/06* (2013.01); *C08L 2205/025* (2013.01)

(58) Field of Classification Search
CPC .. C08J 5/18; C08L 23/06; C08L 91/00; C08K 3/014
See application file for complete search history.

(56) References Cited

U.S. PATENT DOCUMENTS

2004/0080068 A1    4/2004    Ooizumi et al.

FOREIGN PATENT DOCUMENTS

| | | | |
|---|---|---|---|
| CN | 102320133 A | * | 1/2012 |
| CN | 110785461 A | | 2/2020 |
| CN | 111212734 A | | 5/2020 |
| EP | 3239223 A1 | | 11/2017 |
| JP | 2000044709 A | * | 2/2000 |

OTHER PUBLICATIONS

English Machine Translation of JP2000044709 (A) obtained on Mar. 14, 2025 from https://worldwide.espacenet.com/publicationDetails/biblio?CC=JP&NR=2000044709A&KC=A&FT=D&ND=3&date=20000215&DB=EPODOC&locale=en_EP (Year: 2000).*
English Machine Translation of CN102320133 (A) obtained on Mar. 14, 2025 from https://worldwide.espacenet.com/publicationDetails/biblio?CC=CN&NR=102320133A&KC=A&FT=D&ND=3&date=20120118&DB=&locale=en_EP (Year: 2012).*
Supplementary European Search Report, Sep. 16, 2024.
China Patent Office, "Office Action", Jan. 21, 2021, China.

* cited by examiner

*Primary Examiner* — Catherine S Branch
*Assistant Examiner* — Olga Lucia Donahue
(74) *Attorney, Agent, or Firm* — Troutman Pepper Locke LLP; Tim Tingkang Xia, Esq.

(57) ABSTRACT

The present invention relates to a separator film in a lithium battery, more specifically relates to a polyolefin microporous film and a preparation method thereof. The polyolefin microporous film has a porosity above 30% and below 65%, a median pore size above 10 nm and below 60 nm, a stress-strain (σ-ε) curve integral in Machine Direction (MD) and Transverse Direction (TD) directions simultaneously fulfilling the following definition:

$E = \int_0^\varepsilon \sigma(\varepsilon) d\varepsilon > 150 \text{ J/m}^2$; and the largest pore size, the smallest pore size and the median pore size fulfilling the following definition: 0.9<P<1.2, wherein P=(the largest pore size–the smallest pore size)/the median pore size. The polyolefin microporous film according to the present invention has high tenacity, small pore sizes, concentrated distribution of pore sizes, great stability for coiling, and enabling high number of battery cycles. When used as a separator film, battery manufacturing safety and the service life of the battery being made can be increased.

5 Claims, No Drawings

POLYOLEFIN MICROPOROUS FILM AND PREPARATION METHOD THEREOF

TECHNICAL FIELD

The present invention relates to the technical field of separator film used in a lithium battery, and more specifically relates to the technical field of polyolefin microporous film.

BACKGROUND ART

A microporous film used as a separator film in a lithium-ion battery should have the following characterizing features: 1) complete isolation between the positive and negative electrodes and non-participation of the chemical reaction between the positive and negative electrodes; 2) resistant to electrolyte and will not swell or dissolve; 3) contain a large number of micro pores that allow lithium ions to pass through but at the same time prevent short circuit; 4) excellent mechanical strength such as to resist tensional, impact, and frictional forces during manufacturing and use; 5) resistant to thermal deformation so as to prevent deformation or closure of the micro pores, prevent the electrolyte from drying out, and thus prevent reduction of the battery capacity.

A polyolefin microporous film now commonly used in a lithium-ion battery can achieve complete isolation between the positive and negative electrodes, non-participation of the chemical reaction between the positive and negative electrodes, and provide passages for lithium ions. However, the sizes and size distribution (varieties in size) of the micro pores as well as their mechanical strength and heat resistance are difficult to be controlled by manufacturers. Specifically, the prior art faces many obstacles when trying to improve the tenacity of the film and the sizes and size distribution of the micro pores. Usually, when MD (machine direction) and TD (transverse direction) mechanical strengths of the polyolefin microporous film are expressed in the measurements of tensile strength, elongation at break, and Young's modulus, stiffness of the material is more prominently reflected, but the brittle-ductile response of the material is shown to be deficient. In other words, coherence of the polyolefin microporous film with respect to its strength and its ability to deform cannot be reflected, and thus failing to satisfactorily reflect the energy absorption ability of the polyolefin microporous film when the film is subject to external force.

Further, the sizes of the micro pores determine the percentage of ions that can pass through the film as well as the general service life of the battery. If the sizes of the micro pores are too small, internal resistance within the microporous film will increase which does not facilitate transmission of the lithium ions. On the other hand, if the sizes of the micro pores are too large, lithium dendrites may easily grow, resulting in the loss of battery capacity and the risk of short circuit. Distribution (varieties) of the pore sizes will also affect the performance of the battery. Distribution width (range of varieties) of the pore sizes may simultaneously bring about the undesirable effects caused by pore sizes being too large and pore sizes being too small, and therefore reduce the service life of the battery. Accordingly, consistency of pore sizes is also one of the important criteria in the evaluation of a lithium ion separator film.

Prior reference 1, for example, claims that excellent impact resistance can be obtained by controlling a ratio between ultra-high molecular weight polyethylene and high-density polyethylene, and adjusting the stretching temperature, stretching ratio and relaxation ratio of MD and TD. However, the expression used in the method of evaluating impact resistance (i.e. [(tensile strength in MD direction×tensile elongation in MD direction/100)$^2$+(tensile strength in TD direction×tensile elongation in TD direction/100)$^2$]$^{1/2}$≥300) as disclosed by prior reference 1 contains obvious deficiencies. Basically, understanding of the expression can be simplified as a vector sum of energy absorbed during breaks in MD and TD directions. However, occurrence of a break or the maximum value of energy absorption of the polyolefin microporous film is determined by the minimum value of external energy enacted to and bearable by the film in the MD and TD directions, but not the vector sum in the MD and TD directions. Besides, in the expression of prior reference 1, the product of tensile strength and tensile elongation percentage cannot fully express material tenacity, particularly if there is a great difference according to Young's modulus. Given that tensile strength and tensile elongation percentage are the same, material with smaller value according to Young's modulus is likely to have its impact resistance being overrated. Therefore, the expression of prior reference 1 has a higher possibility of overrating impact resistance.

Prior reference 2 discloses a polyolefin microporous film resistant to deformation, made by controlling the ratio of MD elastic modulus and TD elastic modulus (1.5-9) through controlling MD and TD stretching rates and speeds before and after extraction. The resulting film has a high MD direction modulus but a relatively low elongation rate, meaning that not much energy is required to result in a break of the film.

Prior reference 3 discloses a polyolefin microporous film that is less apt to slip and form an uneven edge face upon impact on the coiling body, manufactured also through controlling methods. However, a side effect is that the average pore size, which is 50-90 nm, of the film is too large.

In short, a polyolefin microporous film having small and concentrated pore sizes as well as high tenacity in both MD and TD directions is still not available in the market.

Prior reference 1: WO2018/180714
Prior reference 2: CN101616968B
Prior reference 3: CN102264814B

DISCLOSURE OF THE INVENTION

Problems to be Solved

It is an object of the present invention to provide a polyolefin microporous film having high tenacity and concentrated distribution (small varieties) of pore sizes. The present invention solves the problems of coiling the separator film during battery manufacturing, abnormalities in power charging and discharging, as well as low number of charging-discharging cycles.

Technical Solutions

The present invention provides a polyolefin microporous film, characterized by having the following characteristics:
a. Porosity above 30% and below 65%;
b. A median pore size is above 10 nm and below 60 nm;
c. Stress-strain (σ-ε) curve integral in MD and TD directions simultaneously meet the following definition:

$$E=\int_0^\varepsilon \sigma(\varepsilon)d\varepsilon > 150 \text{ J/m}^2;$$

d. largest pore size, smallest pore size and the median pore size meet the following definition: 0.9<P<1.2, wherein P=(the largest pore size−smallest pore size)/the median pore size.

Further, upon researches by the inventors, it is discovered that tenacity, pore sizes and pore size distribution (varieties) of the polyolefin microporous film can be controlled and adjusted by controlling a temperature of a cast sheet. Accordingly, the technical solution below is also disclosed in the present invention:

A preparation method of polyolefin microporous film, comprising the step of: mixing polyolefin resins and additives to form a mixture, extruding the mixture, and forming the mixture into a cast sheet at 0° C. or below.

Technical Effect of the Present Invention

The polyolefin microporous film made according to the present invention has high tenacity, small pore sizes, concentrated distribution (small varieties) of pore sizes, great stability for coiling, and enabling high number of battery cycles. Therefore, when the polyolefin microporous film of the present invention is used as a separator film, battery manufacturing safety and the service life of the battery being made can be increased.

BEST MODE FOR CARRYING OUT THE INVENTION

Preferred ways of implementing the present invention will be described in detail below with reference to the embodiments. Before we proceed, a person skilled in the art should understand that the technical terms appearing in the description and the claims should not be limited to the interpretations according to an ordinary dictionary. Instead, the inventors should be allowed to appropriately define technical terms for the best explanation of the present invention, and these defined technical terms should be interpreted based on the concept and implication of the technical aspects of the present invention. Accordingly, the description below is only intended to be preferred examples for illustrative purpose, and should not limit the scope of the present invention. Therefore, modifications and other alternative configurations that achieve the same technical effects may be possible given that they are not deviated from the spirit and scope of the present invention.

A preparation method of polyolefin microporous film according to the present invention will be described below. However, given that the characterizing features of the present invention are met, there are no limitations as to the specific types and ratios of polyolefin, plasticizers, antioxidants and other additives being used; the use and if use, the types, of extracting agent; the forms and methods of mixing and extruding, film casting, stretching, and thermoforming; the specific techniques of coiling and dividing; and the use of continuous production method or not.

The preparation method of the polyolefin microporous film according to the present invention mainly comprises the following steps:

Mixing polyolefin resins and additives to form a mixture; extruding the mixture which flows out from a die; cooling the mixture to below 0° C. by a cooling agent to form a cast sheet; performing at least one first stretch of the cast sheet in at least one direction; passing the stretched cast sheet through at least one extracting tank to extract plasticizers; after extraction, performing at least one second stretch of the cast sheet in at least one direction; finally, performing relax thermoforming treatment to obtain a stable final product.

Specifically, the polyolefin resins used in the present invention may be homopolymers such as polyethylene, polypropylene, polybutene, and mixtures thereof, or may be copolymers such as ethylene, propylene, butene, 4-methyl-1-pentene, and mixtures thereof, or may be mixtures of two or more of said homopolymers or copolymers. With a view to forming a film easily from a polymer melt, a viscosity average molecular weight of the polymer is 0.4 million or more, preferably 0.5 million or more, and more preferably 0.6 million or more, and most preferably 0.7 million or more. With a view to processing the polymer melt easily, the viscosity average molecular weight of the polymer is 5 million or less, preferably 4 million or less, more preferably 3 million or less, and most preferably 2 million or less.

The additives of the present invention include plasticizers, antioxidants and other additives; plasticizers can be liquid or solid hydrocarbon mixtures such as white oil and solid paraffin; or organic acid esters such as dioctyl phthalate (DOP); or inorganic acid esters such as trioctyl phosphate (TOP); or organic substances that can form a homogeneous solution or melt with polyolefin resins below the boiling point. One or two types or more of antioxidants can be used to protect the polyolefin resins and the plasticizers from degradation and deterioration, and at the same time render a film surface of the final separator film being made to be flat, smooth and free of defects.

According to the mixing and extruding methods of the present invention, the polyolefin resins, the plasticizers, the antioxidants and the other additives can be premixed by using a mixer and then being put into an extruder to perform melt extrusion. Alternatively, the polyolefin resins, the plasticizers, the antioxidants and the other additives are fed in through the same or different feeding ports via a single screw, dual screws or multi-screws used alone or in combination, and then directly being mixed and extruded.

Film casting and forming methods of the present invention is to trigger thermally induced phase separation between the polyolefin polymer and the plasticizer by cooling through the use of an agent, and then to form a cast sheet having a thickness as practically required by film casting. The cooling agent is any substance that can lower the temperature of the cast sheet to below 0° C., such as liquefied air, nitrogen, carbon dioxide; refrigerants such as coolant; or highly thermal conductive substances such as metals, ceramics, graphite, and graphene. During the process when the cast sheet is cooled to form a two-phase structure, the plasticizers are in a dispersed phase and will undergo a nucleation stage and a growth stage. Nucleation is facilitated by providing stronger supercooling in an initial stage, in other words, there are more number of pores being formed. Given a fixed porosity, the formed pores have small sizes. At the same time, low temperature inhibits the growth of dispersed phase, in other words, it is difficult for the pores to grow bigger and the differentiation of the pore sizes is small, therefore, a structure with small pore sizes and concentrated distribution (small varieties) of pore sizes is obtained. Such a net-shape structure is more stable, avoids defects caused by large pores and uneven force distribution caused by wide distribution of pore sizes. Therefore, the film according to the present invention has high tenacity. The cast sheet forming temperature is preferably 0 to −80° C., and more preferably −35° C. to −80° C.

The stretching method used in the present invention is to perform at least one first stretch and at least one second stretch both in at least one direction before and after extraction respectively. Stretching can be synchronous stretching or asynchronous stretching, or a combination of synchronous stretching and asynchronous stretching. Stretching can be continuous or discontinuous.

Extraction method used in the present invention is to provide one or more extraction tanks in a transporting direction of the stretched (first stretch) cast sheet according to concentration gradient, and eventually residual extracting agent on the film surface or inside the film is removed through a drying air box with a low negative pressure. The extracting agent can be any solvent such as dichloromethane and chloroform, which dissolves together with the plasticizers but does not dissolve polyolefin.

The relax thermoforming method used in the present invention is to perform at least one relax thermoforming treatment in at least one direction of the cast sheet.

A porosity of the polyolefin microporous film prepared by the invention is above 30% and below 65%; a median pore size is above 10 nm and below 60 nm. To obtain high working efficiency and safety of the battery, the porosity is preferably 35%~60%, more preferably 40%~55%, most preferably 45%~50%; the median pore size is preferably 15 nm~50 nm, more preferably 20 nm to 40 nm, and most preferably 25 nm to 35 nm.

To attain dimensional stability of the separator during the coiling process, the tenacity in MD and TD directions is E>150 J/m², preferably E>170 J/m², more preferably E>200 J/m², and still even more preferably selected as E>230 J/m², and most preferably E>250 J/m².

In view of pore size distribution and prolonging the services of battery cycles, the pore size distribution should be 0.9<P<1.2, preferably 0.93<P<1.1, more preferably 0.95<P<1.05, still even more preferably 0.97<P<1.02, most preferably 0.99<P<1.01.

Test Methods for Various Physical Properties According to the Present Invention (1) Viscosity Average Molecular Weight $M_v$ The test for intrinsic viscosity is performed by apparatus model number Julabo AVS370. According to ISO 1628-3: 2010, the solvent is dekalin, the temperature is 135° C. Measure the intrinsic viscosity of polyethylene [η], and then convert the measured value to viscosity average molecular weight according to Margolies's equation.

$$M_v = 5.37 \times 10^4 \times [\eta]^{1.49}$$

(2) Porosity (%)

Use a sample cutter to obtain 50 mm×50 mm samples from the polyolefin microporous film, and measure an average porosity of 20 samples according to surface density using the following formula.

$$\text{Porosity (\%)} = [1 - \rho_{surface} \div (\rho \times d)] \times 100$$

wherein $\rho_{surface}$ is the surface density of the polyolefin microporous film, $\rho$ is a density of polyolefin resins, and d is a thickness of the polyolefin microporous film.

(3) Stress-Strain (σ-ε) Curve

The test for tensile strength is carried out using an Electronic Universal Material Testing Machine (model no.: XJ830) manufactured by Shanghai Xiangjie Instrument Technology Company from China, sample size is 150 mm×15 mm, clamping distance is 50 mm, stretching speed is 50 mm/min, ambient temperature is 25° C., and humidity is 30%~60%. The stress-strain (σ-ε) curve integral in MD (machine direction) and TD (transverse direction) directions, as shown below, reflect the tenacity of the separator film by showing the energy absorption ability of the polyolefin microporous film when subject to external forces, thereby avoiding the deviation caused by differences in elastic modulus:

$$E = \int_0^\varepsilon \sigma(\varepsilon) d\varepsilon$$

(4) Distribution of Pore Sizes

The apparatus used for pore size test is the Capillary Flow Porometer (CFP-1500AE) from Porous Materials, Inc (PMI), a surface tension of an infiltration solution is 15.9 Dynes/cm; the median pore size ($\phi_{mean}$) is obtained from a "half-dry curve" according to "dry-wet process". Both the maximum pore size and the minimum pore size can be obtained from the pore size distribution graph obtained from this test. The maximum pore size ($\phi_{max}$) is the last value in the pore size distribution graph data, which is the pore size corresponding to the bubble point; the minimum pore size ($\phi_{min}$) is the first value in the obtained pore size distribution graph data. Therefore, pore size distribution (P) can be calculated by the following formula:

$$P = (\phi_{max} - \phi_{min}) / \phi_{mean}$$

(5) Services of Battery Cycles

Based on GB/T 18287-2013, measure the remaining capacity (%) of the battery after 500 battery cycles.

(6) Coiling Stability

Coiling a sheet of separator films cut into width of 600 mm with coiling tension 100N and coiling speed 100 m/min. Taking the inner diameter as an origin, measure a horizontal offset distance of the outer diameter after coiling for 3000 m, and record the average value of 10 parallel samples.

Embodiment 1

Polyethylene homopolymers with viscosity average molecular weights of 3.5 million, 1.5 million, and 0.5 million respectively are dry-mixed with 0.5 wt % antioxidant 1010 respectively in proportions of 2.5 wt %, 9 wt %, and 18 wt % respectively, and then added in with 70 wt % white oil respectively; and then all mixtures are transferred to a dual-screw extruder, with a mixing temperature of 220° C., and a cast sheet forming temperature of −35° C.

Next, the cast sheet is introduced into an asynchronous biaxial stretching machine for biaxial stretching. The stretching conditions are MD stretching ratio of 10, TD stretching ratio of 8.8, and stretching temperature of 110° C.

Then the stretched cast sheet is immersed in a dichloromethane extraction tank; after paraffin oil is extracted, the cast sheet is dried by dry air to remove the dichloromethane on the surface and in the interior of the polyethylene microporous film.

After that, introduce the cast sheet into a TD stretching machine with a thermoforming temperature of 127° C., and a relaxation rate of 0.95.

After that, introduce the cast sheet into a MD stretching machine with a thermoforming temperature of 127° C., and a relaxation rate of 0.95.

Finally, perform coiling to obtain the polyethylene microporous film. The physical properties of the obtained polyethylene microporous film are listed in Table 2.

Embodiment 2

Polyethylene homopolymers with viscosity average molecular weights of 3.5 million, 1.5 million, and 0.5 million respectively are used in proportions of 1 wt %, 8.5 wt % and 15 wt % respectively; the proportion of the antioxidant 1010 is 0.5 wt %; the proportion of the added white oil is 75 wt %; the MD stretching ratio and the TD stretching ratio are both 15. Except for the above, other conditions and steps are the same as embodiment 1.

Embodiment 3

Polyethylene homopolymers with viscosity average molecular weights of 3.5 million, 1.5 million, and 0.5 million respectively are used in proportions of 2 wt %, 9.5 wt % and 18 wt % respectively; the cast sheet forming temperature is −80° C. Except for the above, other conditions and steps are the same as embodiment 1.

Embodiment 4

Polyethylene homopolymers with viscosity average molecular weights of 3.5 million, 1.5 million, and 0.5 million respectively are used in proportions of 2 wt %, 9.5 wt % and 28 wt % respectively; the proportion of the antioxidant 1010 is 0.5 wt %; the proportion of the added white oil is 60 wt %; the cast sheet forming temperature is −80° C. Except for the above, other conditions and steps are the same as embodiment 1.

Embodiment 5

Polyethylene homopolymers with viscosity average molecular weights of 3.5 million, 1.5 million, and 0.5 million respectively are used in proportions of 1.5 wt %, 8 wt % and 15 wt % respectively; the proportion of the antioxidant 1010 is 0.5 wt %; the proportion of the added white oil is 75 wt %; the MD stretching ratio and the TD stretching ratio are both 15. Except for the above, other conditions and steps are the same as embodiment 1.

Embodiment 6

The cast sheet forming temperature is 0° C. Except for the above, other conditions and steps are the same as embodiment 1.

Embodiment 7

Polyethylene homopolymers with viscosity average molecular weights of 3.5 million, 1.5 million, and 0.5 million respectively are used in proportions of 3 wt %, 8 wt % and 13.5 wt % respectively; the proportion of the antioxidant 1010 is 0.5 wt %; the proportion of the added white oil is 75 wt %; the cast sheet forming temperature is 0° C.; the MD stretching ratio and the TD stretching ratio are both 15. Except for the above, other conditions and steps are the same as embodiment 1.

Comparative Example 1

Polyethylene resins with viscosity average molecular weights of 1.5 million and 0.5 million respectively are used in proportions of 9.5 wt % and 20 wt % respectively; the MD stretching ratio and the TD stretching ratio are both 7. Except for the above, other conditions and steps are the same as embodiment 1.

Comparative Example 2

A polyethylene resin with viscosity average molecular weight of 0.5 million is used in a proportion of 29.5 wt %. The cast sheet forming temperature is 50° C.; the MD stretching ratio and the TD stretching ratio are both 6. Except for the above, other conditions and steps are the same as embodiment 1.

Comparative Example 3

The cast sheet forming temperature is 50° C. Except for the above, other conditions and steps are the same as embodiment 1.

INDUSTRIAL APPLICABILITY

The present invention obtains a polyolefin microporous film with high tenacity and concentrated pore size distribution and also a preparation method thereof, by changing the proportions of different grades of ultra-high molecular weight polyethylene, the proportions of high-density polyethylene resins, the MD and TO stretching ratios, as well as the cast sheet forming temperature. The obtained polyolefin microporous film has improved machinability in a lithium-ion battery, and enhances the safety and prolongs the service life of the lithium-ion battery.

TABLE 1

Comparisons between the implementations of the embodiments of the present invention and those of the comparative examples

| | viscosity average molecular weight | formula | mixing temp. ° C. | cast sheet forming temp. ° C. | MD stretching ratio | TD stretching ratio | stretching temp. ° C. | TD stretching machine thermoforming temp. ° C. | TD stretching machine relaxation ratio | MD stretching machine thermoforming temp. ° C. | MD stretching machine relaxation ratio |
|---|---|---|---|---|---|---|---|---|---|---|---|
| Embodiment 1 | 3.5 million + 1.5 million + 0.5 million (2.5 wt %\ 9 wt %\ 18 wt %) | 0.5 wt % antioxidant 1010 + 70 wt % white oil | 220° C. | −35° C. | 10 | 8.8 | 110° C. | 127° C. | 0.95 | 127° C. | 0.95 |
| Embodiment 2 | 3.5 million + 1.5 million + 0.5 million (1 wt %\ 8.5 wt %\ 15 wt %) | 0.5 wt % antioxidant 1010 + 75 wt % white oil | — | — | 15 | 15 | — | — | — | — | — |

TABLE 1-continued

Comparisons between the implementations of the embodiments of the present invention and those of the comparative examples

| | viscosity average molecular weight | formula | mixing temp. °C. | cast sheet forming temp. °C. | MD stretching ratio | TD stretching ratio | stretching temp. °C. | TD stretching machine thermo-forming temp. °C. | TD stretching machine relaxation ratio | MD stretching machine thermo-forming temp. °C. | MD stretching machine relaxation ratio |
|---|---|---|---|---|---|---|---|---|---|---|---|
| Embodiment 3 | 3.5 million + 1.5 million + 0.5 million (2 wt %\ 9.5 wt %\ 18 wt %) | — | — | −80° C. | — | — | — | — | — | — | — |
| Embodiment 4 | 3.5 million + 1.5 million + 0.5 million (2 wt %\ 9.5 wt %\ 28 wt %) | 0.5 wt % antioxidant 1010 + 60 wt % white oil | — | −80° C. | — | — | — | — | — | — | — |
| Embodiment 5 | 3.5 million + 1.5 million + 0.5 million (1.5 wt %\ 8 wt %\ 15 wt %) | 0.5 wt % antioxidant 1010 + 75 wt % white oil | — | — | 15 | 15 | — | — | — | — | — |
| Embodiment 6 | — | — | — | 0° C. | — | — | — | — | — | — | — |
| Embodiment 7 | 3.5 million + 1.5 million + 0.5 million (3 wt %\ 8 wt %\ 13.5 wt %) | 0.5 wt % antioxidant 1010 + 75 wt % white oil | — | 0° C. | 15 | 15 | — | — | — | — | — |
| Comparative example 1 | 1.5 million + 0.5 million (9.5 wt %\ 20 wt %) | — | — | — | 7 | 7 | — | — | — | — | — |
| Comparative example 2 | 0.5 million (29.5 wt %) | — | — | 50° C. | 6 | 6 | — | — | — | — | — |
| Comparative example 3 | — | — | — | 50° C. | — | — | — | — | — | — | — |

"—" means the same as embodiment 1

TABLE 2

Physical properties of polyethylene microporous film

| No. | Porosity (%) | MD tenacity E (J/m$^2$) | TD tenacity E (J/m$^2$) | Max. pore size (nm) | Median pore size (nm) | Min. pore size (nm) | Pore size distribution P | Battery capacity after 500 battery cycles | offset distance of outer diameter after coiling 3000 m |
|---|---|---|---|---|---|---|---|---|---|
| Embodiment 1 | 47 | 311 | 323 | 45 | 30 | 15 | 1.00 | 95 | 0 |
| Embodiment 2 | 56 | 162 | 178 | 68 | 44 | 20 | 1.09 | 90 | 0.2 |
| Embodiment 3 | 37 | 234 | 213 | 34 | 22 | 11 | 1.05 | 92 | 0.1 |
| Embodiment 4 | 31 | 278 | 297 | 23 | 14 | 10 | 0.93 | 97 | 0.1 |
| Embodiment 5 | 52 | 222 | 194 | 58 | 39 | 20 | 0.97 | 95 | 0.2 |
| Embodiment 6 | 44 | 250 | 229 | 43 | 27 | 12 | 1.15 | 88 | 0.2 |
| Embodiment 7 | 63 | 157 | 163 | 85 | 55 | 20 | 1.17 | 80 | 0.3 |
| Comparative example 1 | 29 | 140 | 137 | 80 | 50 | 17 | 1.3 | 70 | 0.7 |
| Comparative example 2 | 41 | 127 | 150 | 70 | 42 | 22 | 1.25 | 73 | 0.5 |
| Comparative example 3 | 43 | 257 | 243 | 81 | 41 | 27 | 1.32 | 91 | 0.3 |

The invention claimed is:

1. A preparation method of a polyolefin microporous film, characterized by the step of mixing polyolefin resins with viscosity average molecular weights ranging from 3 to 5 million, polyolefin resins with viscosity average molecular weights from 0.4 to 2 million and additives to form a mixture, extruding the mixture, and forming the mixture into a cast sheet at 0° C. or below; wherein the polyolefin resins with viscosity average molecular weights ranging from 3 to 5 million comprise polyolefin resins with viscosity average molecular weights of 3.5 million, and polyolefin resins with viscosity average molecular weights from 0.4 to 2 million comprise polyolefin resins with viscosity average molecular weights of 1.5 million and polyolefin resins with viscosity average molecular weights of 0.5 million; wherein the polyolefin microporous film has the following characteristics:

a. porosity above 30% and below 65%;
b. a median pore size above 10 nm and below 60 nm;
c. stress-strain (σ-ε) curve integral in Machine Direction (MD) and Transverse Direction (TD) directions simultaneously meet the following definition:

$$E=\int_0^\varepsilon \sigma(\varepsilon)d\varepsilon > 150 \text{ J/m}^2;$$

d. largest pore size, smallest pore size and the median pore size meet the following definition: 0.9<P<1.2, wherein P=(the largest pore size−the smallest pore size)/the median pore size.

2. The preparation method of claim 1, wherein the cast sheet forming temperature is 0° C. to −80° C.

3. The preparation method of claim 1, wherein the cast sheet forming temperature is −35° C. to −80° C.

4. The preparation method of claim 1, wherein the additives comprise plasticizers and antioxidants.

5. The preparation method of claim 1, wherein the polyolefin microporous film has the following characteristics:

a. the stress-strain (σ-ε) curve integral in MD and TD directions simultaneously meet the following definition:

$$E=\int_0^\varepsilon \sigma(\varepsilon)d\varepsilon > 250 \text{ J/m}^2;$$

b. the largest pore size, the smallest pore size and the median pore size meet the following definition: 0.99<P<1.01, wherein P=(the largest pore size−the smallest pore size)/the median pore size;
c. the median pore size is above 25 nm and below 35 nm.

* * * * *